United States Patent
Abbruscato

(10) Patent No.: US 7,148,802 B2
(45) Date of Patent: Dec. 12, 2006

(54) DIRECTION FINDER AND LOCATOR

(76) Inventor: Paul Abbruscato, 142 Howell Ave., Fords, NJ (US) 08863-1405

( * ) Notice: Subject to any disclaimer, the term of this patent is extended or adjusted under 35 U.S.C. 154(b) by 0 days.

(21) Appl. No.: 10/953,986

(22) Filed: Sep. 29, 2004

(65) Prior Publication Data

US 2005/0088301 A1    Apr. 28, 2005

Related U.S. Application Data

(60) Provisional application No. 60/481,504, filed on Oct. 14, 2003.

(51) Int. Cl.
*G08B 1/08* (2006.01)
(52) U.S. Cl. .......... 340/539.13; 340/539.21; 342/133; 342/146
(58) Field of Classification Search ........... 340/539.13
See application file for complete search history.

(56) References Cited

U.S. PATENT DOCUMENTS

| | | | |
|---|---|---|---|
| 3,806,936 A | 4/1974 | Koster | |
| 4,313,035 A | 1/1982 | Jordan et al. | |
| 4,491,971 A | 1/1985 | Webb et al. | |
| 4,706,689 A | 11/1987 | Man | |
| 4,740,788 A | 4/1988 | Konneker | |
| 4,763,268 A | 8/1988 | Itoh et al. | |
| 5,014,040 A | 5/1991 | Weaver et al. | |
| 5,274,359 A * | 12/1993 | Adams | 340/573.6 |
| 5,289,163 A * | 2/1994 | Perez et al. | 340/539.32 |
| 5,394,161 A * | 2/1995 | Ubaldo et al. | 343/702 |
| 5,485,163 A | 1/1996 | Singer et al. | |
| 5,512,879 A | 4/1996 | Stokes | |
| 5,583,517 A | 12/1996 | Yokev et al. | |
| 5,592,180 A | 1/1997 | Yokev et al. | |
| 5,594,425 A | 1/1997 | Ladner et al. | |
| 5,596,313 A * | 1/1997 | Berglund et al. | 340/574 |
| 5,617,074 A | 4/1997 | White | |
| 5,640,146 A * | 6/1997 | Campana, Jr. | 340/573.4 |
| 5,652,570 A | 7/1997 | Lepkofker | |
| 5,714,932 A * | 2/1998 | Castellon et al. | 340/539.11 |
| 5,722,064 A * | 2/1998 | Campana, Jr. | 455/351 |
| 5,731,757 A | 3/1998 | Layson, Jr. | |
| 5,742,233 A | 4/1998 | Hoffman et al. | |
| 5,771,001 A | 6/1998 | Cobb | |
| 5,771,002 A * | 6/1998 | Creek et al. | 340/539.21 |
| 5,812,056 A * | 9/1998 | Law | 340/539.15 |
| 5,841,352 A | 11/1998 | Prakash | |
| 5,850,196 A | 12/1998 | Mowers | |
| 5,892,454 A * | 4/1999 | Schipper et al. | 340/825.37 |
| 5,900,817 A * | 5/1999 | Olmassakian | 340/573.1 |
| 5,905,461 A | 5/1999 | Neher | |
| 6,014,080 A | 1/2000 | Layson, Jr. | |
| 6,109,203 A | 8/2000 | Mears | |
| 6,127,931 A * | 10/2000 | Mohr | 340/573.4 |
| 6,172,640 B1 | 1/2001 | Durst et al. | |
| 6,181,253 B1 * | 1/2001 | Eschenbach et al. | 340/825.37 |
| 6,208,269 B1 | 3/2001 | Brodie et al. | |
| 6,226,589 B1 | 5/2001 | Maeda et al. | |
| 6,232,916 B1 | 5/2001 | Grillo et al. | |

(Continued)

*Primary Examiner*—Daniel Wu
*Assistant Examiner*—George Bugg
(74) *Attorney, Agent, or Firm*—Arthur M. Peslak

(57) ABSTRACT

A direction finder is disclosed that is a hand-held device used to locate a vehicle in a parking lot using a two way radio link, operating in an unlicensed freely available band of the radio spectrum. Made for outdoor use, it is independent of GPS systems, cellular telephone systems, Loran, and any other system with a large infrastructure.

10 Claims, 10 Drawing Sheets

U.S. PATENT DOCUMENTS

| | | |
|---|---|---|
| 6,236,358 B1 | 5/2001 | Durst et al. |
| 6,243,039 B1 | 6/2001 | Elliot |
| 6,263,280 B1 | 7/2001 | Stingone, Jr. |
| 6,269,246 B1 | 7/2001 | Rao et al. |
| 6,275,166 B1 | 8/2001 | del Castillo et al. |
| 6,278,370 B1 | 8/2001 | Underwood |
| 6,317,689 B1 | 11/2001 | Lee |
| 6,331,825 B1 | 12/2001 | Ladner et al. |
| 6,339,397 B1 | 1/2002 | Baker |
| 6,359,568 B1 | 3/2002 | Johnson |
| 6,362,778 B1 | 3/2002 | Neher |
| D456,288 S * | 4/2002 | Arispuro ............... D10/65 |
| 6,388,612 B1 | 5/2002 | Neher |
| 6,392,592 B1 | 5/2002 | Johnson et al. |
| 6,393,294 B1 | 5/2002 | Perez-Breva et al. |
| 6,400,482 B1 | 6/2002 | Lupton et al. |
| 6,421,001 B1 | 7/2002 | Durst et al. |
| 6,421,608 B1 | 7/2002 | Motoyama et al. |
| 6,433,732 B1 | 8/2002 | Dutta et al. |
| 6,441,778 B1 | 8/2002 | Durst et al. |
| 6,489,921 B1 | 12/2002 | Wilkinson |
| 6,509,867 B1 | 1/2003 | McGibney |
| 6,510,380 B1 | 1/2003 | Curatolo et al. |
| 6,510,381 B1 | 1/2003 | Grounds et al. |
| 6,519,530 B1 | 2/2003 | Crockett et al. |
| 6,529,142 B1 | 3/2003 | Yeh et al. |
| 6,542,114 B1 | 4/2003 | Eagleson et al. |
| 6,545,606 B1 | 4/2003 | Piri et al. |
| 6,570,532 B1 | 5/2003 | Mise et al. |
| 6,573,832 B1 | 6/2003 | Fugere-Ramirez |
| 6,573,833 B1 | 6/2003 | Rosenthal |
| 6,577,275 B1 | 6/2003 | Turner |
| 6,580,368 B1 | 6/2003 | Jacobs |
| 6,581,000 B1 | 6/2003 | Hills et al. |
| 6,590,534 B1 | 7/2003 | Kroll et al. |
| 6,738,712 B1 * | 5/2004 | Hildebrant ............... 701/213 |
| 6,788,199 B1 * | 9/2004 | Crabtree et al. ....... 340/539.13 |
| 6,828,907 B1 * | 12/2004 | Galle ...................... 340/425.5 |
| 2001/0026240 A1 | 10/2001 | Neher |
| 2001/0045894 A1 | 11/2001 | Slavin et al. |

\* cited by examiner

DIRECTION FINDER AND LOCATOR

CROSS REFERENCE TO RELATED APPLICATIONS

This application is a non-provisional counterpart of, and claims the benefit of and priority to U.S. Provisional Application Ser. No. 60/481,504, filed Oct. 14, 2003, said Provisional Application being incorporated herein by reference thereto.

BACKGROUND

Devices to locate people, pets, or objects have been used for many years. For years, airplanes have had black box recorders installed that emit homing beacons. Electromagnetic systems that triangulate to the location of an object have been around for decades. Loran is an example of such a system. Most home based portable radio telephones have paging systems, such that if a PAGE/FIND button is pressed on the base unit, the hand-held unit beeps. More recently, global positioning satellites (GPS), cellular telephone towers, and wireless networks have been used to locate moving and non-moving targets. Locating devices use the following different technologies:
  emergency homing beacon continuous transmission;
  activation of receivers at fixed locations in a network;
  triangulation using a private wireless network;
  triangulation using a public switched telephone system;
  triangulation using a cellular telephone system;
  location using GPS and other satellites;
  acoustic signal transmitters and receivers; and,
  electromagnetic signal transmitters and receivers (RF, light, etc.)

Standard automobile keyless entry systems are multi-function hand-held units that come equipped with a small radio frequency transmitter. When a LOCATE or PANIC button is pressed, a receiver unit is activated in the vehicle, and typically the lights flash and the horn sounds. Many motorists press this button to find their vehicles in parking lots and garages. However, not only are the flashing lights and loud horn annoying, but locating a vehicle in this way could also be dangerous. Passers-by often hear the horn blasting and ignore it. However, stalkers might wait by a car whose horn and lights have been so activated so as to snare the unsuspecting motorist. Therefore, it would be desirable to have a hand-held device where the only indication of the vehicle location is on the device itself. A PANIC button is a separate function altogether.

The most desirable locator system would be inexpensive and would comprise a target unit mounted in the vehicle and a hand-held remote mobile unit. Pressing a button on the hand-held unit should activate the target unit, and readouts on the hand-held unit should indicate both the direction and the distance to the target. The system should provide complete privacy.

GPS, cellular, and other wireless systems currently exist that can accomplish this function, but they are expensive. A vehicle locator device of interest is described in a patent granted to Adam Jacobs (U.S. Pat. No. 6,580,368-Jun. 17, 2003). The device described in this patent displays a beam of light above the vehicle when activated by a signal from a hand-held remote. This is especially useful for finding a vehicle in fog or mist where a light beam extends into the mist However, even though the horn does not sound, vehicle location with this device is not private. Lawrence D. Rosenthal invented an ACOUSTIC FINDING SYSTEM (U.S. Pat. No. 6,573,833-Jun. 2, 2003) wherein a lost item can be found by having at least two nearly identical locators. The lost item (such as a key) is attached to one such device. The available locator broadcasts to the lost one an acoustic search signal with a sequence of tones having predetermined frequency differences between them. The second locator then emits a sound or a light beacon. If used on a vehicle, this patent does not teach how to maintain privacy.

An invention of particular interest is one by Yeh, et al. (U.S. Pat. No. 6,529,142-Mar. 4, 2003) for a PARKED VEHICLE LOCATION FINDER. The hand-held device in Yeh is activated by a button that causes a radio frequency beam to be transmitted to a unit mounted in the vehicle. Both the hand-held mobile unit and the vehicle target unit comprise a digital compass and altimeter. Both units can sense their orientation with respect to true north. When activated, the target unit signals the mobile unit as to which direction to turn to find the vehicle. Directional lights illuminate on the mobile unit, and change with changes in the orientation of the mobile unit. The digital altimeters are used to determine the elevation of the vehicle with respect to the motorist. It will sense when the vehicle is above or below the motorist on a different floor. However, it cannot indicate a distance to the target, and the use of a digital compass and altimeter in both units add to the expense of the system.

It is therefore an object of the present invention to provide an inexpensive radio frequency system comprising a hand-held remote unit and a target unit, that will operate in an unlicensed freely available band of the radio spectrum, and that will provide a visual indication of direction and approximate distance to the target. It is also an object to insure privacy by allowing only the hand-held unit to visually indicate target location. No audible signals should sound. It is an additional object to allow the target unit to move slowly while being tracked and still permit location of the target. It is a further object of the present invention to be suitable for outdoor use, and independent of GPS systems, cellular telephone systems, Loran, and any other system with a large infrastructure.

SUMMARY OF THE INVENTION

All of the aforementioned objectives are met by the present invention. The DIRECTION FINDER AND LOCATOR comprises a hand-held mobile unit and a target unit. Pressing a button on the mobile unit causes a radio signal to transmit to be received by the target unit which, in turn, transmits a radio signal to be received by the mobile unit. Lights are used to visually display both the direction to the target as well as whether the user is moving toward or away from the target. The user will then know that he or she is homing in on the target.

DETAILED DESCRIPTION OF THE INVENTION

Figure 1:
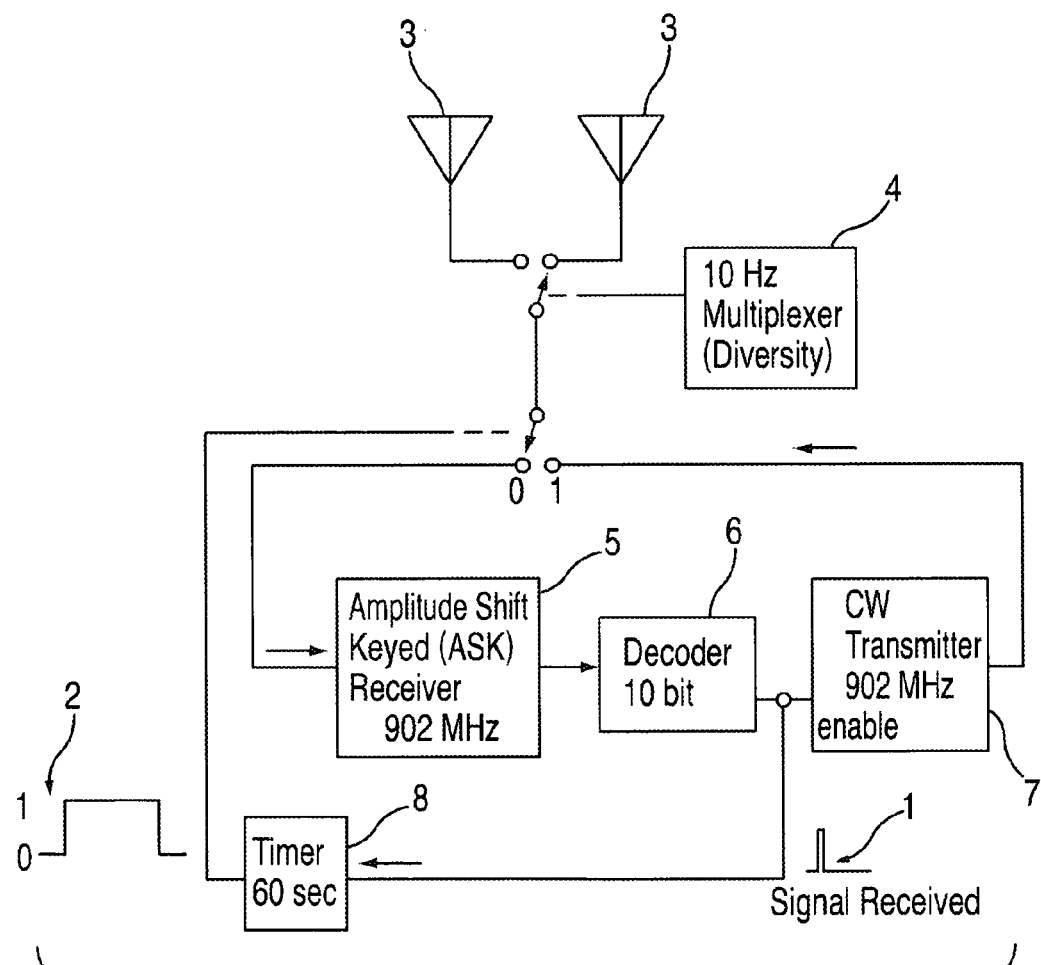
FIG. 1—Car Unit Block Diagram
FIG. 2—Hand-held Unit Block Diagram
FIG. 3—Car Unit Schematic
FIG. 4—Hand-held Unit Schematic
FIG. 5—Melexis Double Conversion Receiver 6
FIG. 6—Melexis Receiver Schematic
FIG. 7a—First Embodiment of Hand-held Unit 20.

The present invention will now be described in terms of the presently preferred embodiment as illustrated in the drawings. Those of ordinary skill in the art will recognize that many modifications may be made thereto without departing from the spirit or scope of the present invention.

There are two parts to the direction finder. The first component is located in the vehicle, preferably in the trunk, with one or two glass mounted antennas typically on the rear windshield. No holes are drilled into the glass nor into the exterior of the vehicle. The signal is fed through the glass. The antennas typically protrude a few inches above the roof of the vehicle.

The second component is a mobile unit that is preferably a portable handheld device, with folding antennas and LED indicators. This unit is held at waist height and pointed in various directions, with the indicators showing which way to turn, and ultimately in the direction of the car unit.

In operation, the vehicle unit receives electric current from the car battery, and is always active as are remote door locks when the car is left unattended. When the operator presses a button on the mobile unit, the vehicle unit comes alive and sends out a signal for about one minute. The mobile unit is moved around and the operator walks to the vehicle, following the indicators. If the operator has not reached the vehicle by the time its signal has been deactivated, the button on the mobile unit may be pressed again, to start another minute of operation. No audible indicators are used either on the vehicle or on the mobile unit, keeping the search private. Similarly, no lights are activated on the vehicle, as with some other locators.

To find his or her vehicle, the user points the mobile unit in various directions. If the unit is pointed far to the left or right of the car (such as 90 degrees), no indicators are lit. If the unit is pointed in the general direction of the car, but not directly at it, the first (bottom) one or two indicators are lit. If the car is somewhat close, when the unit is pointed directly at the car, all four indicators are lit. At long distances, even if the unit is pointed directly at the car, perhaps only the first three of the four indicators will be lit, indicating that the car is at a distance. Then, as the user approaches the car, there will be a distance (perhaps 200 feet, selectable by those of ordinary skill in the art), where all four indicators will be lit. In this way, the four indicators show signal strength as well as direction, giving the user a sense of "homing in" on the car. The unit may be suitable for day or night operation, with a current range of about 800 feet in clear unobstructed conditions. The unit can operate with many vehicles in the path between the operator and the vehicle to be located, even if there is no line of sight. The range may be reduced somewhat in that mode. Although the range is better with two antennas on the car, it can be operated with one to simplify the wiring. The unit can be used in parking garages, although the user has to be on the correct floor. It can also be used at an outdoor sports facility. The unit will generally not work from inside the building in a shopping mall due to obstructing walls, however it will work if there is no building between the user and the car.

An additional use for this device is to locate children and pets, in which case a much smaller transmitter would be attached to a wristband or collar, or something similar. Such a device competes with elaborate GPS systems, which start at several hundred dollars and have subscriber monthly fees of up to $40. Some of those competing systems charge the user each time it is used. With this locator, there is no need to set up an account once the unit is purchased.

Figure 2:
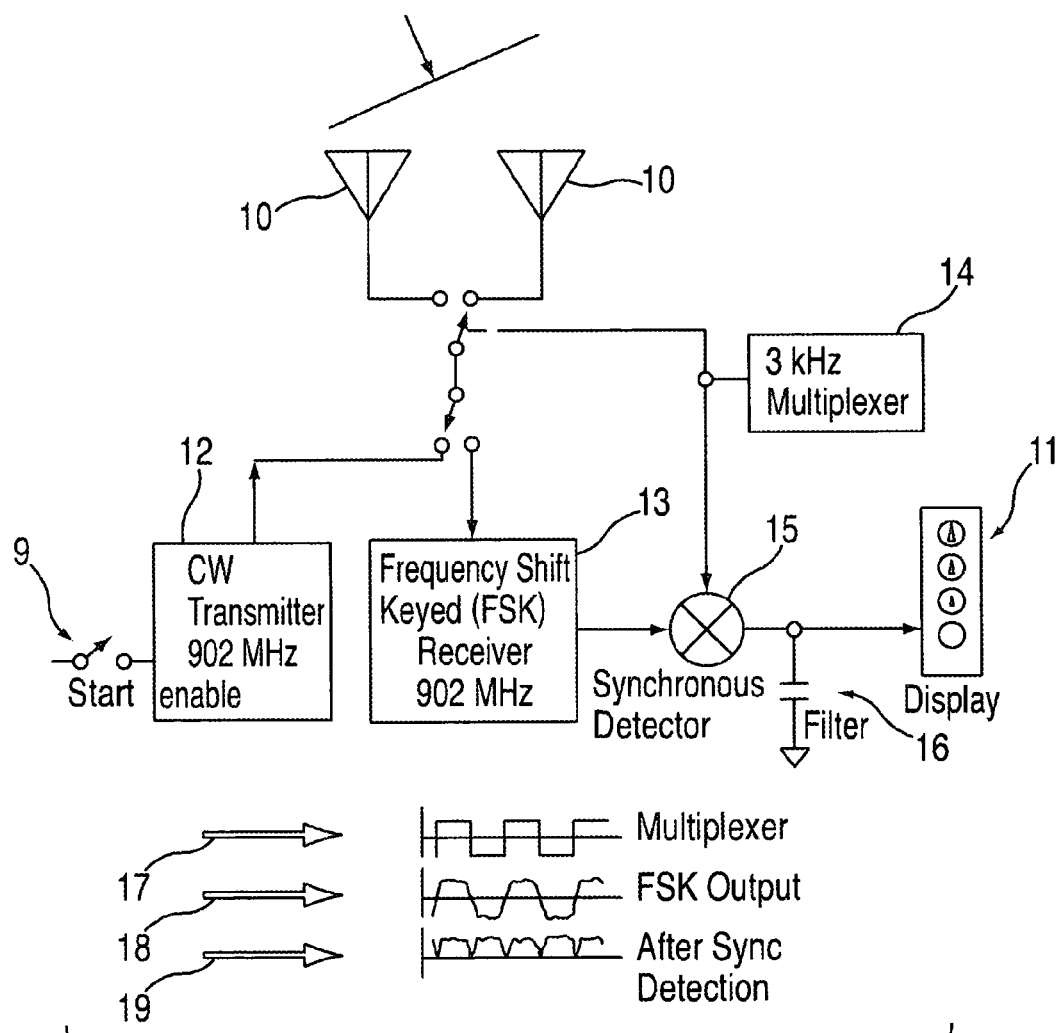

FIG. 1 is a block diagram of the electronics of the vehicle target unit, while FIG. 2 is a block diagram of the electronics of the hand-held unit. The target unit of FIG. 1 comprises two antennas, 3, a 10 Hz Multiplexer (Diversity), 4, and a switched series circuit comprising an Amplitude Shift Keyed (ASK) Receiver, 5, a 10-bit Decoder, 6, and a CW Transmitter, 7. The hand-held mobile unit of FIG. 2 comprises an activation button, 9, two antennas, 10, and a display, 11. The unit internals further comprise a CW Transmitter, 12, an FSK Receiver, 13, a Synchronous Detector, 15, and a Filter, 16. The square wave 17 as seen by multiplexer 14 becomes a noisy square wave 18 as the output of the FSK Receiver 19 after detection by Synchronous Detector 15.

The direction finder is bi-directional. The hand-held unit transmits an AM ON/OFF encoded signal, 1, in the 902–928 MHz ISM band, similar in form to a garage door opener. This signal lasts for as long as the button is pushed. The car unit, whose receiver is always on (like a remote door lock), then transmits CW, 2, at the same frequency, for one minute. This is controlled using a Timer, 8. During this minute (which can be adjusted by those of ordinary skill in the art), the hand-held unit receives this signal. The unique car identifier feature is primarily programmed into the hand-held unit and the receiver of the car unit. Should several cars in the same area be activated to transmit at the same time, the exact CW frequency may be made different by randomization of the units as they are built. If in the unlikely event that there is still interference, encoding could be used in the car to hand-held unit direction as well.

Figure 3:
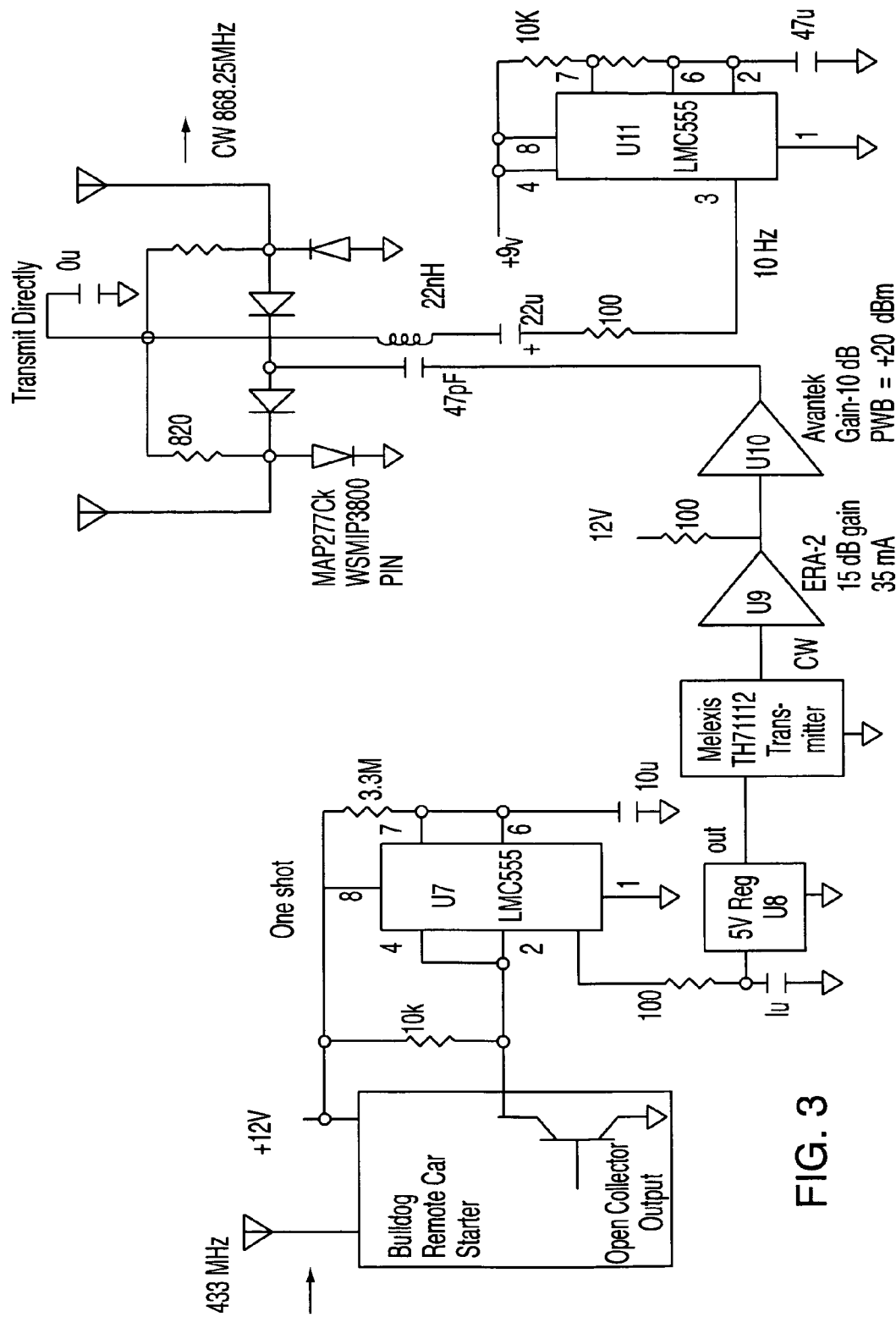

FIG. 3 is an electrical schematic of the car unit. In the schematic, the Amplitude Shift Keyed (ASK) receiver and decoder are in the form of a commercial remote car starter such as is manufactured under the Bulldog® Trademark. The timer is a conventional 555, and the transmitter is a single chip synthesized CW generator, operating at a regulated 5V.

Figure 4:
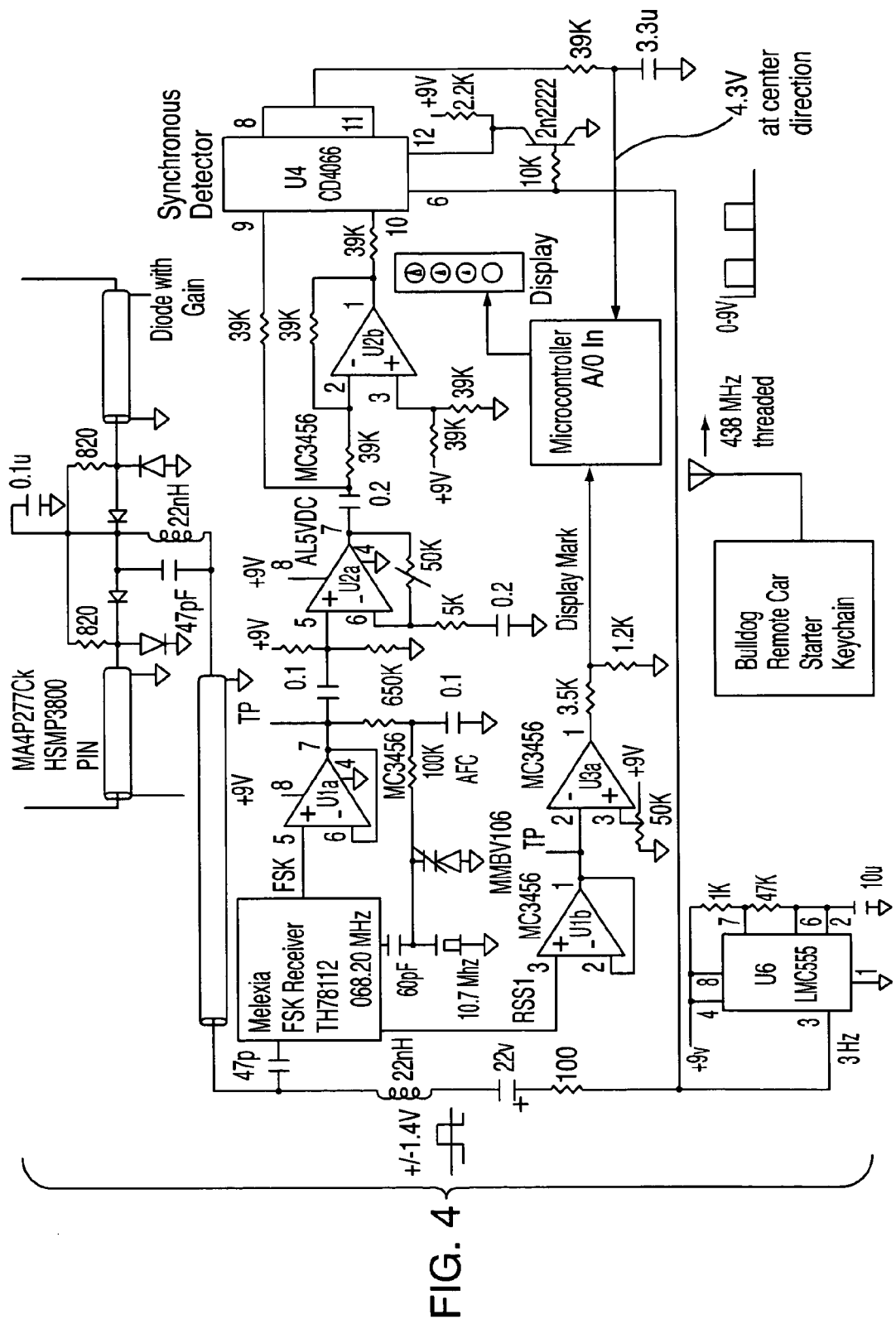
Figure 5:
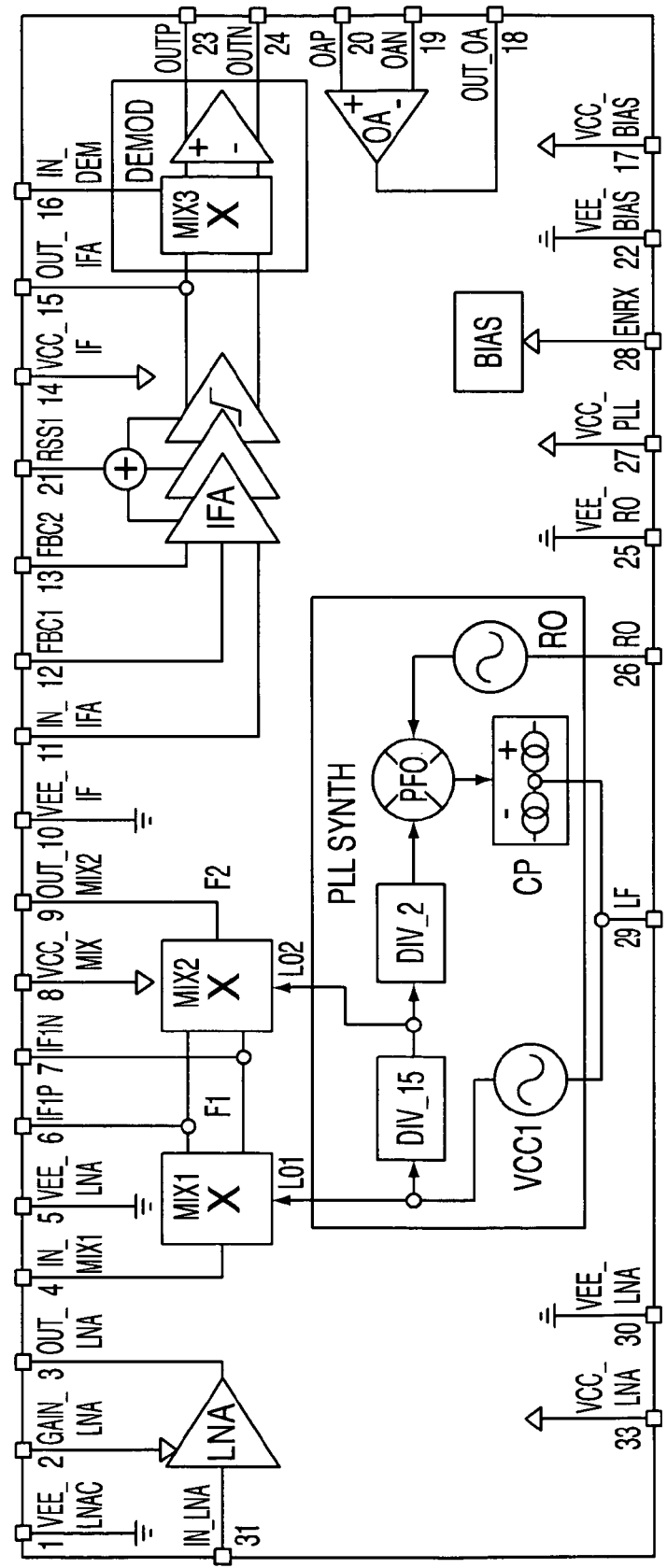
Figure 6:
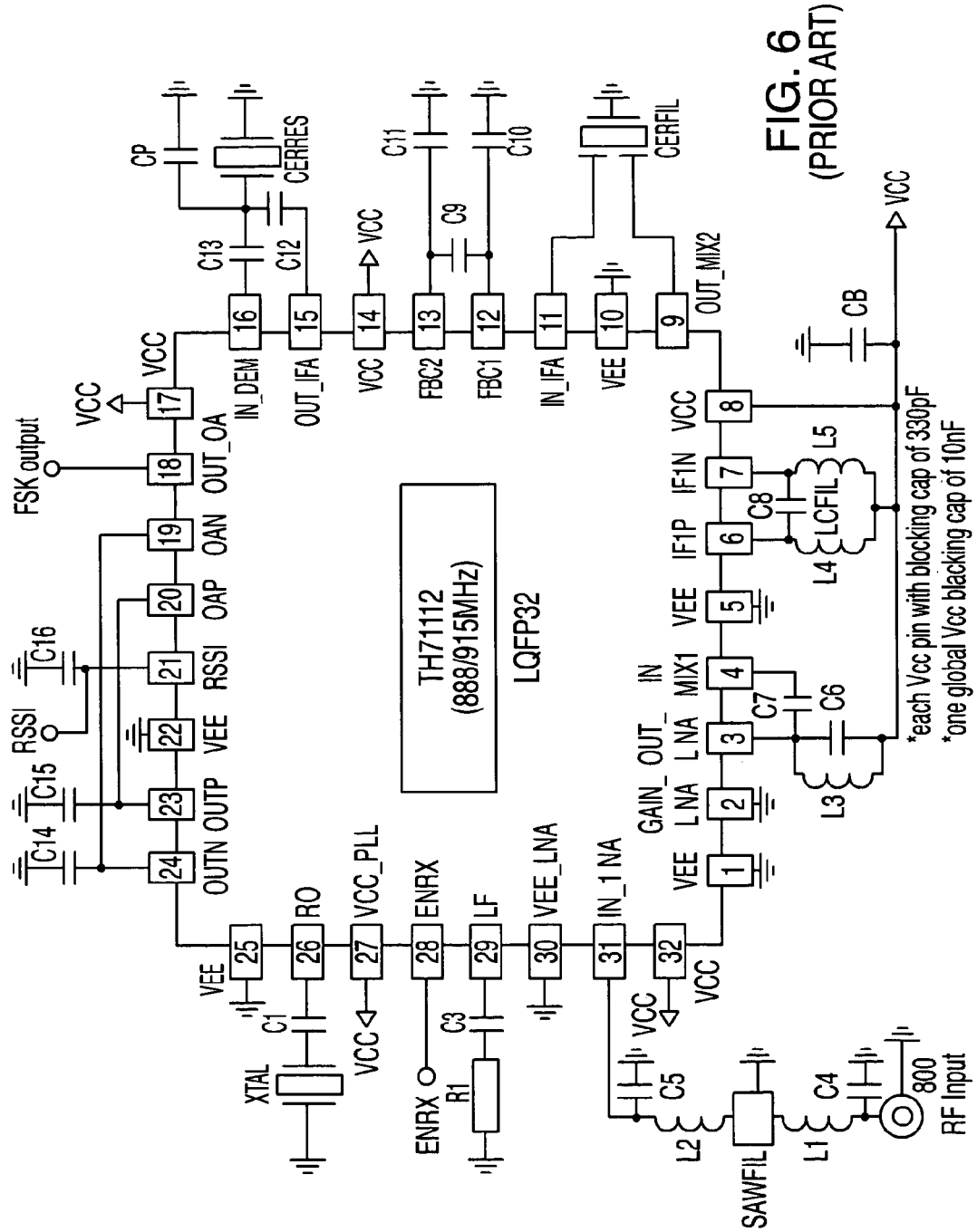
Figure 7A:
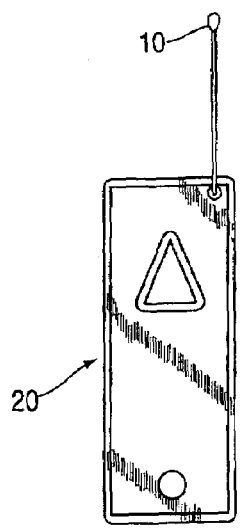
FIG. 7(b)—The Hand-Held Unit when closed.
FIG. 7(d)—The Hand-Held Unit when open.
FIG. 7(c)—The Hand-held Unit When Partially Open
FIG. 8—Additional Embodiments of Hand-held Unit
FIG. 8(a)—Front View of Second Embodiment FIG. 8(*b*)—Side View of Second Embodiment
FIG. 8(*c*)—Third Embodiment Partially Open
FIG. 8(*d*)—Third Embodiment Fully Open
FIG. 9—Use Of The First Embodiment To Locate Car In Parking Lot
FIG. 9A—Detail Of Mounting of Car Unit
FIG. 10—Fourth Embodiment of Hand-held Unit
Figure 7B:
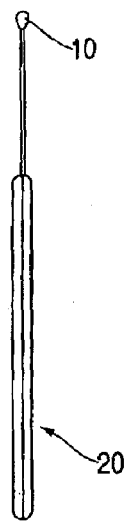
Figure 7D:
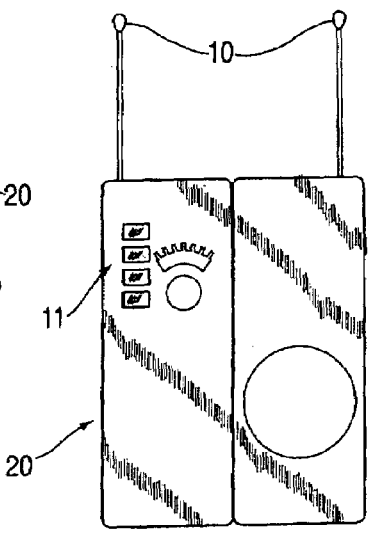
Figure 7C:
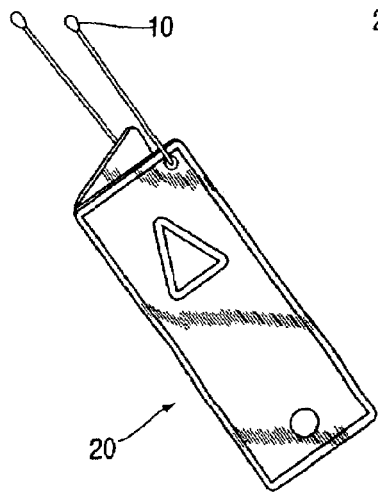
Figure 8A:
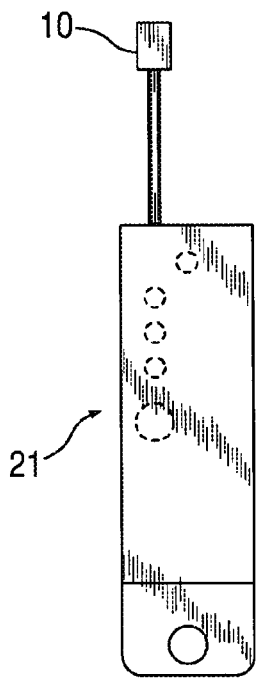
Figure 8C:
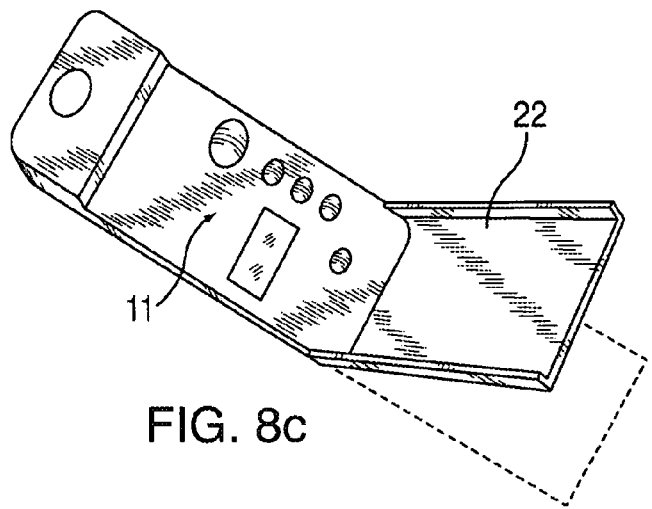
Figure 8B:
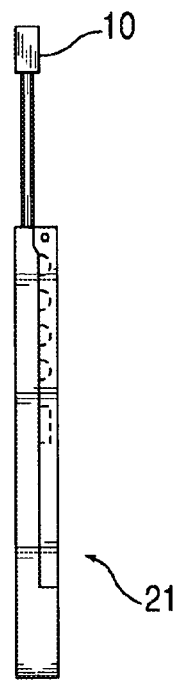
Figure 8D:
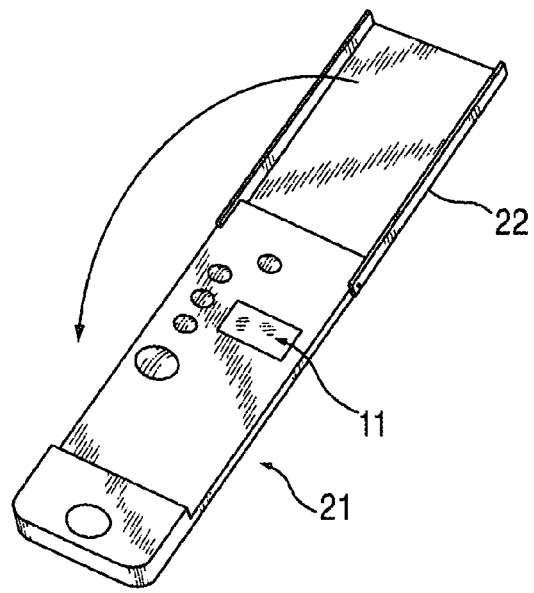

FIG. 4 is a schematic of the hand-held unit. The receiver is a Melexis TH71112 dual conversion unit. Table 1 sets forth the specifications for this device in more detail. The details of the receiver are shown in FIGS. 5 and 6. The two antennas are multiplexed at 3 kHz with PIN diodes acting as switches. The loss through the switches is about 1 dB or less. The 47 pF capacitor and the 22 nH inductor isolate the 3 KHz and the 900 MHz RF from each other, so that one line can be run to the antenna (the center conductor of the coaxial cable is used for both RF and 3 kHz).

Op amps buffer the FSK output and also provide a 4.5 V centered signal (½ Vcc), AC coupled, for the synchronous detector U4 to operate with. This avoids the necessity for a dual power supply. A 9V battery is used, which needs no regulation. When the two antennas are equidistant from the source (car), the output of the FSK receiver is essentially zero, except for noise, which averages out in the 3.3 microfarad capacitor and 39 K resistor.

When the hand-held unit is pointed off center, an in sync or out of sync noisy square wave comes out of the receiver, depending on the direction that the unit is pointed. The synchronous demodulator essentially is a four quadrant multiplier, or correlator of a sort. The result is a DC voltage indicating the location of the source. When centered, the DC voltage is 0Vcc.

FIG. 5 and FIG. 6 show schematics for the Melexis Receivers which are well known to those of ordinary skill in the art.

TABLE 1

FSK Receiver Specifications.

Figure 10:
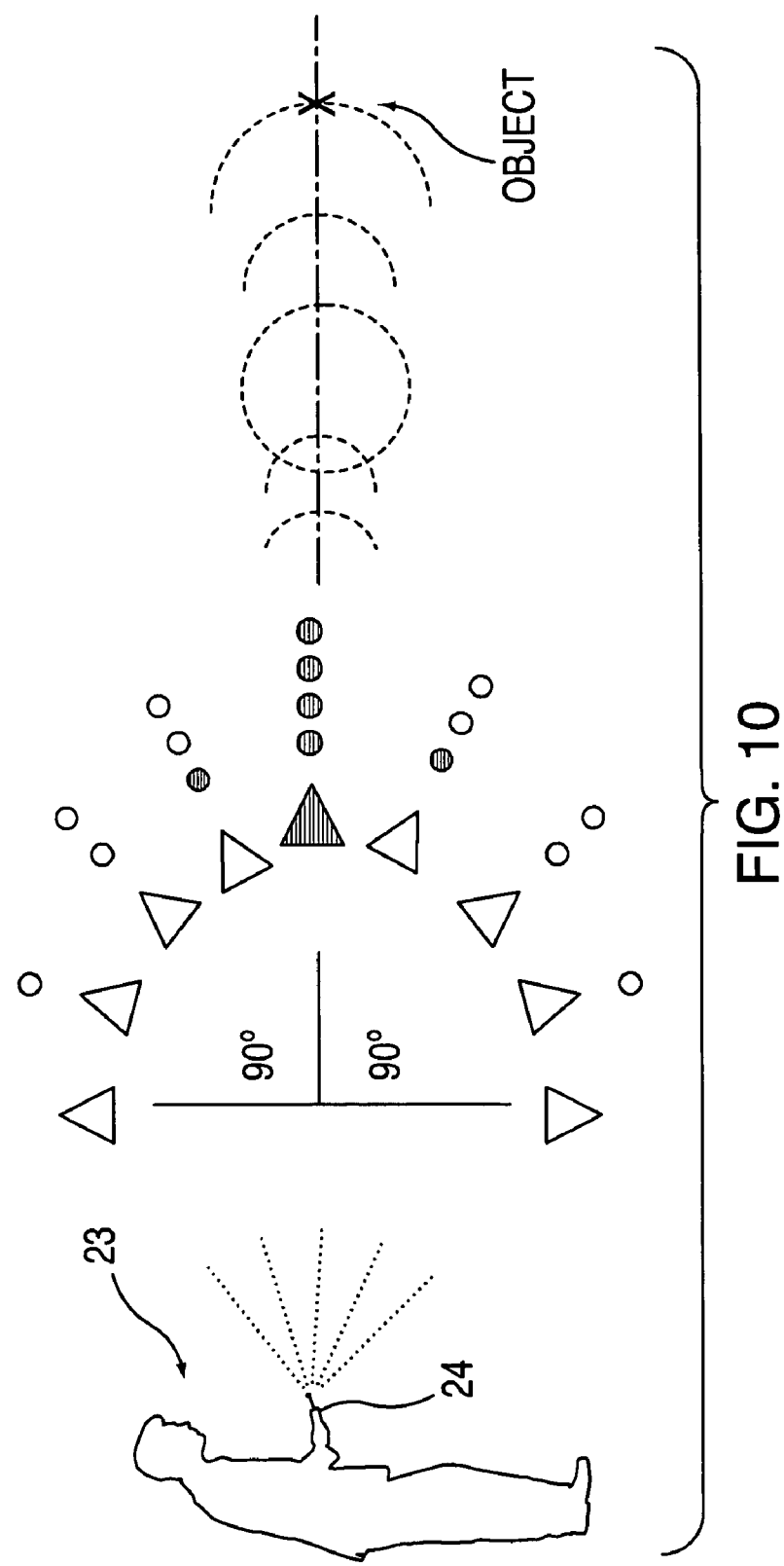

TH71112 Data Sheet
Features.
Double superheat architecture for high degree of image rejection FSK for digital data and FM reception for analog signal transmission
FM/FSK demodulation with phase-coincidence demodulator
Lowcurrent consumption in active mode and very lowstandby current
Switchable LNA gain for improved dynamic range
RSSI allows signal strength indication and ASKdetection
Surface mount package LQFP32
Application Examples General digital and analog 868 MHz or 915 MHz ISM band usage
Low-power telemetry
Alarm and security systems
Keyless car and central locking
Pagers
Technical Data Overview ■ Input frequency range: 800 MHz to 930 MHz Power supply range: 2.5 V to 5.5 V
Temperature range: −40° C. to +85° C.
Operating current: 7.5 mA at lowgain and 9.2 mA at high gain mode
Standby current: I 00 nA
Sensitivity: −109 dBm 1) with 40 kHz second IF filter BW (incl. SAW front-end filter loss)
Sensitivity: −102 dBm 2) with 150 kHz second IF filter BW (incl. SAW front-end filter loss)
Range of first IF: 10 MHz to 80 MHz cont
Range of second IF: 455 kHz to 21.4 MHz
Maximum input level: −10 dBm at ASK and 0 dBm at FSK
Input impedance: 50 ohms.
Image rejection: >65 dB (e.g. with SAW front-end filter and at 10.7 MHz 2nd IF)
Spurious emission: <−70 dBM
Input frequency acceptance: +50 kHz (with AFC option)
RSSI range: 70 dB. Frequency deviation range: :t5 kHz to:t 120 kHz
Maximum data rate: 80 kbitls NRZ
Maximum analog modulation frequency: 15 kHz 1) at +/−8 kHz FSK deviation, BER = 3E−3 and phase-coincidence demodulation
2) at +/−50 kHz FSK FIG. 7, FIG. 8 and FIG. 10 show various embodiments of the hand-held mobile unit. The direction finding mechanism is "time of arrival" sensing, which measures the phase difference of the wavefront with two antennas at generally different distances from the transmitter. This is a common type of direction finding, especially in the HF, VHF and UHF bands.

As illustrated in FIG. 7, the hand-held mobile unit, 20, has two vertical dipole antennas, 10, multiplexed at 3 KHz. These antennas are slightly less than a half wavelength apart. When a given antenna is unselected, it is "opened" at the point of coaxial launch, so that it does not affect the wavefront approaching the other antenna. Thus the resulting multiplexed signal is phase modulated at 3 kHz, by an amount (in degrees) proportional to the antenna offset. These phase transitions, which are fairly abrupt, are detected by the FSK receiver. This is a dual conversion single chip receiver by Melexis, fully synthesized, with a SAW filtered input. The two IF frequencies are 70 MHz and 10.7 MHz. The 10.7 MHz signal is demodulated with a ceramic resonator tank, which locks (resonates) to the average phase of the two halves of the signal. The tank output is recombined with FSK modulated IF signal in a mixer/demodulator. The OC voltage at the output of the demodulator represents the direction of the incoming signal from the car. This voltage is fed into the microcontroller.

In addition, a signal strength indicator is available from the receiver, (not shown in the schematics), which is also fed to the microcontroller, which in turn controls the indicator lights/LEDs. The microcontroller comprises a decision making algorithm programmed into it, such that based on direction and signal strength, the four LED indicators light up progressively as the unit is pointed closer to the car, and light up sooner and more aggressively as the user is approaching the car.

FIG. 8 represents an alternate embodiment of the hand-held unit. Mobile unit 21 has a flip cover 22 that opens and closes to produce a compact unit that can fit in a pocket. The flip cover opens to expose display 11, and when closed, the display cannot be seen. Antennas 10 retract at will.

Figure 9A:
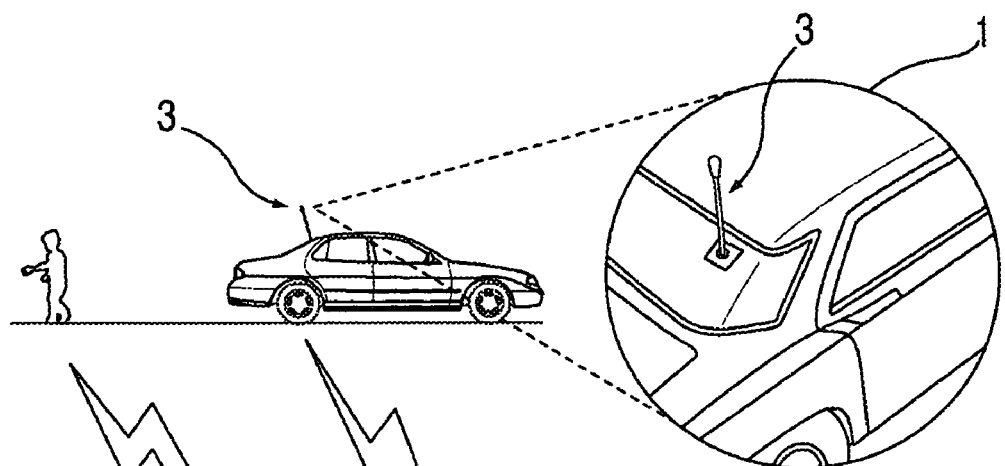
Figure 9:
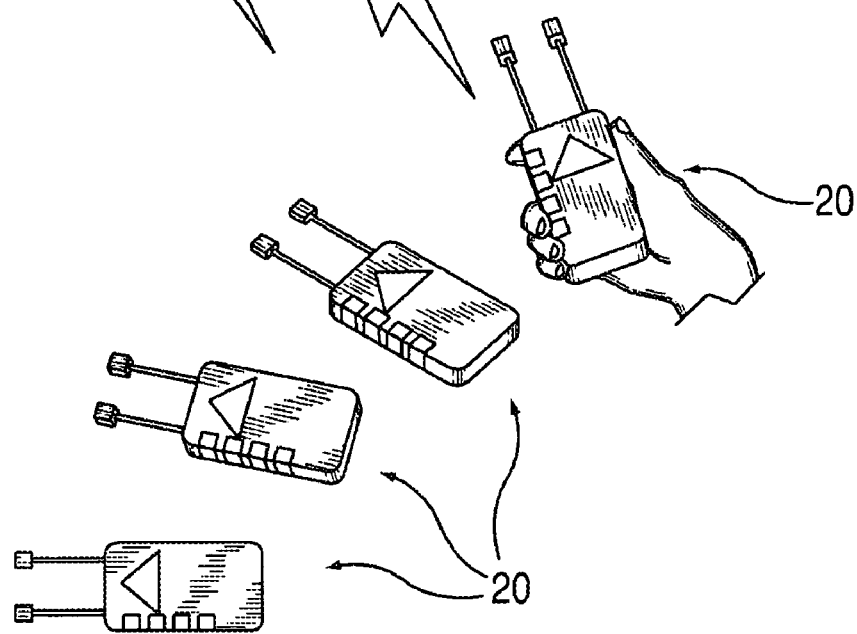

Referring to FIG. 9, two antennas, 3, are used in the car unit, primarily for the purpose of transmission diversity. It has been found that multipath signals due to reflections off other vehicles or wire fences and such are much less of a problem when transmission diversity is used. In this mode, the hand-held unit, 20, tends to average the readings of two paths, and fading and dead spots are much less of a problem because the likelihood of both paths forming a dead spot at the same time is low. Also, the use of two antennas on the car maximizes the probability of receiving the trigger signal from the hand-held unit, for reasons of reducing fading. The antennas are multiplexed at 10 Hz. While idle, the multiplexed antennas in the car unit are fed to the ASK receiver. Once a trigger is received, the antennas are switched to the output of the CW transmitter for the 1 minute interval.

FIG. 10 is an illustration of yet another alternate embodiment for the hand-held unit. In this embodiment, user 23 turns hand-held unit 24 to better determine direction. The closer the mobile unit points to the direction of the vehicle target unit, the display lights up closer to the central display. The number of lights that are illuminated are now indicative of distance to the target unit.

Finally, the hand-held unit may incorporate some ancillary devices, functions, or means. By this, we mean that it may incorporate the standard prior art functions and structure to implement inter alia remote door locking and unlocking, trunk opening, horn sounding, lights flashing, or alarm sounding. It means that it may also incorporate displays for weather or other useful information. It also means that it may incorporate a device for attachment to a belt or a key. This list is not meant to limit the definition of ancillary devices, functions or means.

Those of ordinary skill in the art will recognize that the foregoing description merely illustrates an embodiment of the present invention and many modifications may be made thereto without departing from the spirit or scope of the present invention as set forth in the following claims.

What is claimed is:

1. A direction finder and locater utilizing a synchronous detector comprising a remote unit and a target unit wherein:
   (a) the remote unit comprises:
      (1) a housing;
      (2) a power source;
      (3) a remote unit radio signal transmitter;
      (4) a directional antenna and a second antenna located approximately three feet from the directional antenna;

(5) an operator controllable activation device that when activated causes the remote unit radio signal transmitter to transmit a first radio signal with a wavelength of approximately 13 inches;
(6) a remote unit radio signal receiver tuned to receive a second radio signal transmitted from the target unit, the second radio signal having an amplitude;
(7) an electronic amplitude measurement circuit to measure the amplitude of the second radio signal; and,
(8) a visible display comprising a plurality of indicator lights that shows the operator an indication of the amplitude of the second radio signal wherein:
  i. the said indication changes as the remote unit points toward or away from the target unit; and,
  ii. the said indication changes as the remote unit moves closer or further away from the target unit; and
(b) the target unit comprises:
  (1) a housing;
  (2) a connection to a power source;
  (3) two antennas;
  (4) a target unit radio signal receiver tuned to receive the first radio signal from the remote unit; and
  (5) a target unit radio signal transmitter that continuously transmits the second radio signal in response to the first radio signal.

2. The device of claim 1 wherein the target unit further comprises a timer unit that becomes active when the target unit radio signal receiver receives the first radio signal and then terminates transmission of the second radio signal after a specified time period.

3. The device of claim 1 wherein the display of the remote unit comprises a plurality of indicator lights that illuminate to indicate the amplitude of the second radio signal as received by the directional antenna.

4. The device of claim 3 wherein the remote unit comprises a different amplitude threshold of the second radio signal for illumination of each of the indicator lights.

5. The device of claim 4 wherein all of the indicator lights of the remote unit are positioned to form a single straight line.

6. The device of claim 5 wherein the indicator lights of the remote unit are positioned in order of their respective amplitude thresholds.

7. The device of claim 4 wherein the indicator lights of the remote unit are positioned to form several straight lines angularly displaced from one another wherein the indicator lights of each line are positioned in order of their respective amplitudes.

8. The device of claim 7 wherein the sequence of amplitude thresholds of each line of the indicator lights is essentially the same as each of the other lines.

9. A direction finder and locator utilizing a synchronous detector comprising a remote unit and a target unit wherein:
(a) the remote unit comprises:
  (1) housing means;
  (2) a means for providing power to the remote unit;
  (3) a means for transmitting a first radio signal with a wavelength of approximately 13 inches;
  (4) an operator controllable activation means that, when activated, causes the transmitting means to transmit the first radio signal;
  (5) a means to receive a second radio signal transmitted from the target unit, the second radio signal having an amplitude;
  (6) a means to measure the amplitude of the second radio signal; and
  (7) a display means to visually display an indication of the amplitude of the second radio signal wherein:
    i. the indication changes when the remote unit points in a direction toward or away from the target unit; and
    ii. the indication changes as the remote unit moves closer or further away from the target unit; and
  (8) a first and second antenna means, wherein the second antenna is located approximately three feet from the first antenna; and
(b) the target unit comprises:
  (1) housing means;
  (2) a means for connecting the target unit to a power source;
  (3) a means for receiving the first radio signal;
  (4) a means for continuously transmitting the second radio signal; and
  (5) a first and second antenna means.

10. The device of claim 9 wherein the target unit further comprises a timing means that becomes active when the target unit means for receiving the first radio signal receives the first radio signal, and then terminates transmission of the second radio signal after a specified time period.

* * * * *